(12) United States Patent
Pridoehl et al.

(10) Patent No.: US 9,433,969 B2
(45) Date of Patent: Sep. 6, 2016

(54) MULTICOLOUR EXTRUSION-BASED 3D PRINT PROCESS

(71) Applicants: Markus Pridoehl, Grosskrotzenburg (DE); Guenter Schmitt, Darmstadt (DE); Dirk Poppe, Frankfurt am Main (DE); Stephan Kohlstruk, Duelmen (DE); Benjamin Hammann, Frankfurt (DE); Sonja Cremer, Sulzbach (DE); Kris Beks, Bilzen (BE); Ludo Dewaelheyns, Zutendaal (BE)

(72) Inventors: Markus Pridoehl, Grosskrotzenburg (DE); Guenter Schmitt, Darmstadt (DE); Dirk Poppe, Frankfurt am Main (DE); Stephan Kohlstruk, Duelmen (DE); Benjamin Hammann, Frankfurt (DE); Sonja Cremer, Sulzbach (DE); Kris Beks, Bilzen (BE); Ludo Dewaelheyns, Zutendaal (BE)

(73) Assignee: EVONIK RÖHM GmbH, Darmstadt (DE)

( * ) Notice: Subject to any disclaimer, the term of this patent is extended or adjusted under 35 U.S.C. 154(b) by 182 days.

(21) Appl. No.: 14/068,395

(22) Filed: Oct. 31, 2013

(65) Prior Publication Data

US 2014/0134334 A1 May 15, 2014

(30) Foreign Application Priority Data

Nov. 9, 2012 (EP) .................................... 12192030

(51) Int. Cl.
*B05D 1/26* (2006.01)
*B29C 67/00* (2006.01)

(52) U.S. Cl.
CPC ........... *B05D 1/265* (2013.01); *B29C 67/0055* (2013.01); *B29C 67/0085* (2013.01)

(58) Field of Classification Search
CPC .............. B05D 1/265; B29C 67/0085; B29C 67/0055; B29C 70/20
USPC ......... 264/308, 401; 425/375, 143; 427/256, 427/331, 337, 340, 348, 372.2, 427/434.2–434.7, 356
See application file for complete search history.

(56) References Cited

U.S. PATENT DOCUMENTS

| | | | |
|---|---|---|---|
| 5,121,329 A | 6/1992 | Crump | |
| 5,444,472 A * | 8/1995 | Due ........................ | B41J 2/195 347/7 |
| 6,129,872 A | 10/2000 | Jang | |
| 6,165,406 A | 12/2000 | Jang et al. | |
| 6,401,002 B1 | 6/2002 | Jang et al. | |

(Continued)

FOREIGN PATENT DOCUMENTS

| | | |
|---|---|---|
| EP | 1 475 220 A2 | 11/2004 |
| EP | 1 558 440 B1 | 12/2006 |

(Continued)

OTHER PUBLICATIONS

U.S. Appl. No. 14/116,244, filed Nov. 7, 2013, Pridoehl, et al.

(Continued)

*Primary Examiner* — Nahida Sultana
(74) *Attorney, Agent, or Firm* — Oblon, McClelland, Maier & Neustadt, L.L.P.

(57) ABSTRACT

A 3D extrusion print process for producing multicolored three-dimensional objects is provided. The process produces mechanically stable, multicolored 3D objects with good color definition. The process according to the invention is based on coating, upstream of the printing head, of the polymer strand used for producing the actual object, and on fixing of the coating upstream of entry of the polymer strand into the printing head. Downstream of the extrusion process in the printing head, the coating remains predominantly at the surface of the extruded strand.

13 Claims, 1 Drawing Sheet

(56) References Cited

U.S. PATENT DOCUMENTS

| | | | |
|---|---|---|---|
| 6,713,125 B1 | 3/2004 | Sherwood et al. | |
| 7,648,664 B2 | 1/2010 | Teal et al. | |
| 7,929,171 B2* | 4/2011 | Han | G06F 3/1285 |
| | | | 358/1.13 |
| 9,123,367 B1* | 9/2015 | Dexter | G11B 5/4813 |
| 2002/0111707 A1 | 8/2002 | Li et al. | |
| 2004/0251574 A1 | 12/2004 | Collins et al. | |
| 2009/0035405 A1* | 2/2009 | Leavitt | B29C 47/0021 |
| | | | 425/97 |
| 2010/0007692 A1* | 1/2010 | Vanmaele | B29C 67/0055 |
| | | | 347/21 |
| 2010/0076495 A1 | 3/2010 | Lindemann et al. | |
| 2010/0327479 A1 | 12/2010 | Zinniel et al. | |
| 2010/0330144 A1* | 12/2010 | Liu | B05B 13/0442 |
| | | | 424/423 |
| 2011/0262622 A1* | 10/2011 | Herre | B41J 3/4073 |
| | | | 427/8 |
| 2012/0164256 A1* | 6/2012 | Swanson | B29C 41/52 |
| | | | 425/162 |
| 2014/0265035 A1* | 9/2014 | Buser | B29C 67/0088 |
| | | | 264/401 |
| 2014/0328963 A1* | 11/2014 | Mark | B29C 67/0088 |
| | | | 425/143 |
| 2015/0290875 A1* | 10/2015 | Mark | B29C 67/0088 |
| | | | 264/138 |
| 2015/0314531 A1* | 11/2015 | Mark | B29C 67/0074 |
| | | | 264/241 |
| 2016/0009030 A1* | 1/2016 | Mark | B29C 67/0085 |
| | | | 264/308 |

FOREIGN PATENT DOCUMENTS

| | | |
|---|---|---|
| EP | 1 432 566 B1 | 6/2007 |
| EP | 1 491 322 B1 | 8/2010 |
| GB | 2 419 679 A | 5/2006 |
| WO | WO 01/26023 A1 | 4/2001 |
| WO | WO 2008/075450 A1 | 6/2008 |
| WO | WO 2008/077850 A2 | 7/2008 |
| WO | WO 2009/139395 A1 | 11/2009 |

OTHER PUBLICATIONS

U.S. Appl. No. 14/116,515, filed Nov. 8, 2013, Pridoehl, et al.

\* cited by examiner

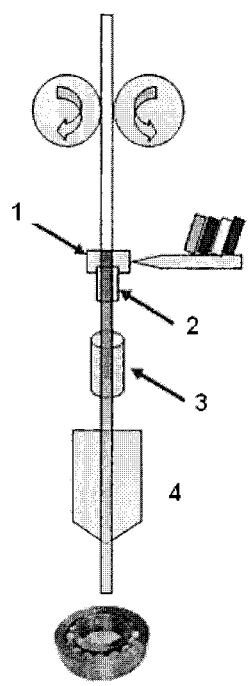

MULTICOLOUR EXTRUSION-BASED 3D PRINT PROCESS

CROSS REFERENCE TO RELATED APPLICATIONS

This application claims priority to European Application No. 12192030.0, filed Nov. 9, 2012, the disclosure of which is incorporated herein by reference in its entirety.

BACKGROUND OF THE INVENTION

1. Field of the Invention

The invention relates to a modified extrusion-based 3D print process, in particular a modified fused deposition modeling process for producing multicoloured three-dimensional objects. In particular, the invention relates to a 3D printing process which is superior to conventionally known methods in its ability to produce mechanically stable, multicoloured 3D objects. The process according to the invention is based on coating, upstream of the printing head, of the polymer strand used for producing the actual object, and on fixing of the coating upstream of entry of the polymer strand into the printing head. Downstream of the extrusion process in the printing head, the coating remains predominantly at the surface of the extruded strand. The coating may contain any of colorants and functional additives.

2. Description of the Background

Rapid prototyping or rapid manufacturing processes are manufacturing processes which aim to convert available three-dimensional CAD data directly and rapidly into workpieces, as far as possible without manual intervention or use of moulds.

The scope of rapid prototyping processes has grown to include a variety of processes. These processes can be divided into two groups: laser-based processes and processes without use of a laser.

The best-known laser-based 3D printing process, which is at the same time the oldest, is stereolithography (SLA). In this process, a liquid composition of a radiation-curable polymer is hardened layer-by-layer by using a laser. The person skilled in the art can clearly see that the only possibility with a workpiece produced by this method is subsequent coloring on the surface. This is complicated and time-consuming.

A similar process is Selective Laser Sintering (SLS), in which, by analogy with the SLA, a pulverulent raw material, e.g. a thermoplastic or a sinterable metal, is sintered selectively layer-by-layer by a laser. Again, the first step of this process can only produce single-color, or non-specifically colored, 3D objects. The same applies to the third laser-based process, "laminated object manufacturing", in which layers of a paper web or plastics foil provided with adhesive are adhesive-bonded to one another and cut by a laser. The subsequent coloring of an object is described in U.S. Pat. No. 6,713,125.

A conventionally known 3D printing process which can also be used for the production of multicoloured objects is the UV ink-jet process. In this three-stage process, a pulverulent material is applied in thin layers, a UV-curable liquid is printed in the form of the respective layer of the subsequent three-dimensional product onto the said layers, and finally the printed layer is hardened by using a UV source. These steps are repeated layer-by-layer.

In EP 1 475 220, variously colored liquids are provided with hardener, and in WO 2008/077850 are also mixed in a chamber directly upstream of the printing process. Selective coloring is thus possible. However, no sharp color transitions are possible, because of the mixing chamber. This type of process moreover lacks sharpness at the limits of the hardening process, and this can reduce surface smoothness, and can sometimes lead to non-uniform coloring. In WO 01/26023, two printing heads are described with variously colored hardener compositions, giving different elasticity properties in the products. However, the number of colors described is not more than two.

WO 2008/075450 describes a variant in which radiant heat, instead of UV light, is used for hardening and variously colored hardener compositions are similarly used.

GB 2419679 discloses a process in which variously colored polymer particles are applied selectively and can be hardened at various wavelengths. This process is extremely complicated, and leads to color definition that lacks sharpness.

In a process in accordance with WO 2009/139395, similar to 3D ink-jet printing, a colored liquid is applied layer-by-layer and printed selectively with a second liquid which leads to a curing reaction with the first liquid. This type of process can only produce a structure of layer-by-layer colors, except in so far as mixing can occur between the uncured layers of liquid.

Another process is Three-Dimensional Printing (TDP). In this process, by analogy with the ink-jet process, pulverulent materials, which preferably are ceramics, are saturated selectively layer-by-layer with the melt of a thermoplastic polymer. After each print layer, a fresh layer of the pulverulent material must be applied. Solidification of the thermoplastic forms the three-dimensional object.

In the process described in US 2004/0251574, the print of the thermoplastic is followed by selective printing with an ink. This process has the advantage of permitting highly selective printing. However, this process has the disadvantage that it is impossible to achieve uniform color definition or bright coloring, since there is no possibility of achieving uniform penetration of the ink into the composite made of the (ceramic) powder and of the binder.

In the process described in EP 1 491 322, two different materials are printed. The first comprises the binder and a colorant which is precipitated on contact with the second material and thus colors the surface selectively. It is thus possible to produce better color properties on the surface of the object. However, there are problems with the uniform mixing of the two materials and with the complicated two-stage process. There is no description of how, or whether, it is possible to ensure that good color definition is achieved with a multicolor print.

In U.S. Pat. No. 6,401,002, various liquids are used with different inks and the binder. The said liquids are either applied separately dropwise or combined by way of connecting lines in a nozzle upstream of the dropwise application process. The person skilled in the art is aware that neither procedure gives ideal color definition. In the former, the mixing of the inks takes place in viscous liquids on the surface. This mixing is therefore rarely complete. In the second procedure, pressure differences in the connecting lines can lead to extreme color variation.

Among printing processes for the production of three-dimensional objects, the process that is most economical in use of materials and that is also most advantageous in terms of design of machinery is the fused deposition modeling (FDM) process. This involves an extrusion-based, digital manufacturing system. There are also other known processes that are substantially analogous with slight differences, for example fused filament fabrication (FFM), melted extrusion manufacturing (MEM) or selective deposition modeling (SDM).

In the FDM method, two different polymer filaments are melted in a nozzle and are printed selectively. One of the materials involves a support material which is needed only at locations above which an overhanging part of the 3D object is printed and requires support during the subsequent printing procedure. The support material can be removed subsequently, e.g. via dissolution in acids, bases or water. The other material (the build material) forms the actual 3D object. Here again, the print is generally achieved layer-by-layer. The FDM process was first described in U.S. Pat. No. 5,121,329. Coloring is mentioned in general terms in US 2002/0111707, but is not described in any detail.

In the process described in EP 1 558 440, the individual layers are color-printed in a subsequent step. This process is slow, and printing of the thermoplastics that are already hardening leads to poorly resolved color definition.

In the 3D color-printing method in accordance with U.S. Pat. No. 6,165,406, separate nozzles are used for each individual ink. There are therefore only very restricted possibilities for ink mixing, and the color effect achieved becomes very simple.

In the FDM variant described in U.S. Pat. No. 7,648,664, variously colored build materials are used in granulate form, melted separately from one another, and mixed with one another in accordance with color requirement by an intervening extruder, before application as print. This method requires very complicated apparatus, and many advantages of FDM are lost.

In a very similar system according to EP 1 432 566, the mixing of the molten granulates is achieved directly in the heated printing head before these are directly applied as print. The said mixing can certainly not be complete, and the quality of print representation is correspondingly poor. Another disadvantage here is moreover that granulates or powders must be used and that these require separate storage and melting in the machine.

U.S. Pat. No. 6,129,872 describes a process in which the build material is melted in a nozzle and various colorant mixtures are metered selectively into the melt at the end of the nozzle. However, this leads to inadequate mixing and does not give clean color definition.

US 2010/0327479 describes a process in which a plurality of colored filaments are combined in a microextruder and are continuously extruded therein to give a new colored filament, which is then passed onward into the printing head for application as print. This process requires very sophisticated and complicated apparatus. The achievable color range is moreover subject to restriction resulting from the number of filaments. In an alternative embodiment, the variously colored filaments can also be conducted directly into the printing head, and mixed there. However, this variant also exhibits the disadvantages described above.

Therefore, an object of the present invention was to provide a 3D print process which can produce selectively colored and/or multicoloured three-dimensional objects with sharp and clear color definition.

Another object of the present invention was to provide an advantageous and rapid 3D print process for printing mechanically stable, multicolored objects.

Another object of the present invention was to provide a method having the ability to produce colored objects where the introduction of the color is not to be postponed to a downstream operation.

Other objects are not explicitly mentioned but are apparent from the entire context of the description, claims and examples below.

SUMMARY OF THE INVENTION

These and other objects have been achieved by the present invention the first embodiment of which includes an extrusion 3D printer, comprising:
a first printing head comprising a nozzle for applying a build material as print;
a filament stream supplied to the printing head to be melted and provide the build material;
a coating unit upstream to the printing head on the filament stream;
a fixing region located between the coating unit and the printing head; and
a plurality of feed containers equipped with metering devices to supply a coating composition comprising at least one of an additive and an ink to the coating unit;
wherein the coating material applied to the filament in the coating unit is completely or incompletely fixed in the fixing region before entering the printing head.

In a special embodiment the extrusion 3D printer further comprises:
a printing head for applying a support material as print; and
optionally, a third printing head constructed equivalently to the first printing head and comprising a filament stream for a second build material.

The present invention also includes a process for multi-color extrusion 3D printing, comprising, in a continuous sequence:
coating a filament in a coating unit with an additive composition comprising a dye composition,
fixing the coating on the filament to obtain a build material;
passing the build material into a nozzle of a printing head;
melting the build material in the nozzle; and
discharging the melted build material from the nozzle of the print head.

BRIEF DESCRIPTION OF THE DRAWING

The FIGURE shows a schematic diagram of the components of a printing head according to one embodiment of the invention.

DETAILED DESCRIPTION OF THE PREFERRED EMBODIMENTS

The invention provides a modified extrusion 3D printing process for colored 3D printing. The expression "extrusion 3D printing process" in particular means a fused deposition modeling process (hereinafter abbreviated to FDM) or printing processes very similar to the FDM process. The text below uses the following expressions synonymously: extrusion 3D printing process, extrusion-based 3D printing process, FDM printing process and FDM 3D printing process. Other expressions also used synonymously hereinafter are extrusion 3D printer, extrusion-based 3D printer, FDM 3D printer and FDM printer.

The design of an FDM 3D printer, and the relevant process parameters, is described in U.S. Pat. No. 5,121,329 and US 2010/0327479. In relation to the present invention, the person skilled in the art may make appropriate use of these parameters for other extrusion-based 3D printing processes.

For the purposes of this invention, the term printing head means the entire device for the conveying, melting and application of a filament in an extrusion-based 3D printing process.

For the purposes of this invention, the term composition means the composition which according to the invention is applied to the polymer strand. The composition comprises inks, pigments and/or additives.

For the purposes of this invention, the term fixing means the drying, hardening, polymerization, crosslinking, binding, or addition reaction or other reaction of the coating.

For the purposes of the present invention, the term filament means the unprocessed form of the build materials or of the support materials in the form of a strand. According to the invention, the filament is melted in the printing head and is then applied as print to give a 3D object. The filament comprises a thermoplastically processable material. The filament may generally be a polymer filament, but is not restricted thereto. It may also be possible that polymer filaments are composed only to some extent of a thermoplastically polymeric matrix material, and are also composed of fillers or of metals.

The problems addressed may be solved by providing a novel extrusion-based 3D printer for producing single-colored or multicolored, three-dimensional objects made of filaments, which has a printing head with upstream coating unit and with a fixing region or fixing unit downstream thereof.

The extrusion-based 3D printer generally has at least one printing head which prints a build material, and generally has a further printing head which prints a support material which is likewise added in the form of a filament. Each of the printing heads has a nozzle which in turn is composed of at least two regions. The polymer is present in solid form in the first, upper region of the nozzle, and the polymer is present in molten form in the second, lower region of the nozzle. Within the printing head, the transition between the solid condition in the upper region and the molten condition in the lower region is continuous.

The present invention includes a device for coating a filament of this type, in particular the build material, and for applying the coated filament as print.

In particular, in the device according to the invention, upstream of entry into the printing head, the filament is coated by in a coating unit with additives and/or inks from a plurality of feed containers, equipped with metering devices. The device according to the invention includes downstream of the coating unit and upstream of the actual printing head, a fixing unit, which in the simplest case is a drying unit and/or a region in which air-drying takes place.

The coating unit may be an arrangement with one or more nozzles, in particular with one or more ink-jet printing heads. An alternative embodiment may include a sponge-like material which surrounds the filament and which has been saturated with the ink, or involves an annular gap of minimal dimension to which varying mixtures of colorant or of additives are continuously charged. At the location where the filament leaves the coating unit, there may preferably be a restriction by means of which the thickness of coating on the filament is adjusted appropriately for the design of the printing head. The coating unit may moreover have an outlet for excess coating compositions and for cleaning procedures. Care must be taken that the composition introduced into the coating unit, or the coating stripped by the restriction, does not in turn simply escape by way of the outlet, but that instead there is a specific control system to reduce materials usage. There may moreover be a collection container provided to the outlet in order to collect the residues.

The fixing unit may be a thermal drying unit, for example a source of IR radiation, and/or may include an optionally temperature-controlled jet of air or of gas. The coated filament is passed through the fixing unit and volatile constituents may be removed by the drying unit. It may thus be possible to avoid subsequent running of undried inks. It may moreover be possible to avoid the problem of evolution of gas from volatile constituents in the nozzle during the print process; this can in turn lead to formation of bubbles or to imprecise print.

Care may also be taken at the fixing unit to collect volatile constituents released—for example solvents—or to conduct these away without causing harm.

As an alternative to the thermal drying unit, it may also be possible to carry out air-drying upstream of entry of the coated filament into the printing head. For this, the coated filament must, after leaving the coating unit and upstream of entry into the printing head, pass through at least a section measuring 1 cm, preferably measuring at least 10 cm, particularly preferably measuring at least 15 cm and with particular preference measuring at least 25 cm. In one preferred embodiment, the coating unit and the printing head may be within a heated housing. In this design, it is preferable that care is taken to provide adequate ventilation of the interior of the housing, and that care is taken to conduct volatile constituents away without causing harm.

The fixing of the coating may also be achieved or accelerated through a chemical reaction such as polymerization, addition reaction or crosslinking, instead of or in addition to the drying process.

In the simplest case, the coating applied may contain a reactive mixture which under ambient conditions reacts spontaneously and may thus be fixed. For this, the coated filament must, after leaving the coating unit and upstream of entry into the printing head, pass through at least a section measuring 1 cm, preferably measuring at least 10 cm, particularly preferably measuring at least 15 cm and with particular preference measuring at least 25 cm.

As an alternative, the fixing of the coating may also be achieved or accelerated by UV radiation, microwave radiation, magnetic induction or cold plasma or other types of plasma. The length of the fixing section may thus be markedly reduced.

To the extent that a reactive coating is applied, another possibility is incomplete fixing of the coating upstream of the printing nozzle. Further fixing may then take place downstream of the extrusion procedure, again by plasma, UV radiation, microwave radiation, magnetic induction. It may thus be possible to improve interlayer adhesion.

In another embodiment, downstream of the extrusion process, the coating may also react with atmospheric moisture, oxygen or water, thus improving the interlayer adhesion and/or the mechanical properties of the component, altering the coloring and gloss, or improving the roughness of the surface.

Because of the relatively low shear rates within the printing head, and the appropriately adjusted viscosities of polymer and coating at the selected extrusion temperature, very little mixing of the coating with the filament occurs during the extrusion process in the printing nozzle, as long as this has not been equipped with a further device, e.g. a static mixing device.

This gives a component composed of strands predominantly coated or colored at the surface. This process therefore saves material when comparison is made with a bulk-coloured polymer matrix. This method moreover applies additives, in particular adhesion promoters, precisely where these are needed in order to increase the stability of the 3D object downstream of the extrusion process.

In an optional embodiment, the composition may be introduced into the coating unit by way of a dynamic mixer or preferably by way of a static mixer. Various additives, pigments and/or inks may first be introduced into the mixer. The mixture produced in the mixer is then passed onwards into the coating unit.

It may be preferable that this is a mixer attached directly on the coating unit or forming an integral unit therewith, in order to minimize dead volume, pressure losses and the extent of connecting lines. The mixture of inks, pigments and/or additives is applied to the surface of the solid filament. During the subsequent extrusion process in the printing head, partial mixing of the coating with the molten main filament may occur through diffusion in the melt. As described, however, homogeneous distribution in the melt is not necessary, since the subsequent surface of the three-dimensional object is composed predominantly and advantageously of the coating introduced, which forms the surface of the melt strand. With this variant it is therefore in particular possible to provide a process which produces highly coloured objects with relatively low colorant consumption, or gives a markedly more intense colour shade when the surface is coated with the same amount of colorant.

Corresponding considerations also apply to additives, especially those intended to improve adhesion between the individual layers in the three-dimensional object. These are needed only on the surface of the melt strand.

In another embodiment, the printing head has an additional dynamic or static mixer in the lower region of the nozzle, in the region of the molten filament. However, an additional mixer of this type is in principle not necessary in order to obtain good color definition in the final product.

The arrangement of the printing head, of the coating unit and of the other components may be selected relatively freely, requiring compliance according to the invention only in relation to the sequence. It may therefore optionally also be possible that the filaments pass through the coating unit and/or the fixing unit horizontally or upwards. Deflector rolls may be used in such an embodiment to achieve changes of direction prior to entry into the printing head, which generally prints downwards.

It is also possible to pass the filament through a flexible tube, as an alternative to deflector rolls. This variant has the advantage that operation of the printer may be more reliable. However, a deflector roll may have the advantage of higher filament tension.

The filament is conveyed by conventionally known mechanism, generally involving two conveying rolls and a motor driving these, where one or both rolls can be driven. Alternatives to this arrangement are described in US 2010/0076495. The location of the primary conveying unit may be at the entry to the printing head. As an alternative, or else in particular in addition, there can be a further conveying unit directly behind the fixing unit and preferably upstream of an optional deflecting roll or of a flexible guide tube. There can be a further conveying unit—with its own motor and independently controllable—directly behind the filament roll on which the unprocessed filament is provided, and upstream of the coating unit.

It may be preferable that, directly upstream of the coating unit, there is a guide system or a brake, e.g. in the form of one or two braking rolls, which reliably provide tensioning of the filament in the coating unit. It may be particularly preferable that there is then a second conveying unit or a second guide system directly behind the fixing unit that follows the coating unit, or that there is a second conveying unit or a second guide system downstream of the minimal section measuring 1 cm that is necessary for the drying process.

For miniaturization of the printer it is optionally possible to omit the tensioning, since only minimal horizontal movement is possible in the coating unit.

Since the printing head is generally moved horizontally across the entire print bed during the printing process, it is necessary to ensure that the filament permits adequate freedom of movement directly upstream of the printing head. This can be achieved in that all of the components from the filament roll to the printing head by way of the coating and/or drying unit are moved together. In another possible alternative—as previously described—there may be two conveying units, one arranged directly behind the fixing system and the second arranged directly upstream of, or within, the printing head, these being controlled separately from one another in such a way that the amount of filament present between the two positions is sufficient firstly to permit free independent control of the printing head and secondly to avoid excessive sag of the filament.

The extrusion-based 3D printer according to the invention may have other optional components. The following list provides examples and is not intended to be exclusive:

Methods such as plasma discharge may optionally be used upstream of the coating unit to activate the unprocessed filament in order to improve adhesion.

The arrangement may moreover optionally have, upstream of the respective printing head, color detectors and/or sensors for determining the diameter of the filament or the thickness of the ingoing filament and of the coated filament; information from these can be used to optimize the flow of materials, and for color monitoring and print control.

The colorants used in the device may be compositions of various colorants, for example involving three primary colours, an example being the subtractive mixing of magenta, cyan and blue and, respectively, yellow, or the additive mixing of the constituent colours red, green and blue of light. When three primary colors are used, black may preferably be added as fourth "color" thereto. Another alternative is use of a white as fourth or fifth "color", where appropriate for the build material. However, some "true-color" systems may also require up to twenty colors. Preference is in particular given to systems using at least 10, in particular 12, different colors. This type of system may achieve greater brilliance of color.

The differently constituted color systems described are conventionally known to the person skilled in the art from 2D printing. Each of the colorants used is provided in a separate feed container equipped with its own metering device, and is metered directly therefrom, as required by the embodiment, into the coating unit or the dynamic mixer.

The additives preferably comprise one or more adhesion-improving additives. As an alternative, or in addition, additives may also include UV-crosslinking agents or thermally or magnetically activatable adhesives. Another embodiment may include the addition of additives in order to improve haptic properties, of coating constituents that are dirt-repellent and/or that improve scratch resistance, or of additives for surface stabilization, e.g. UV stabilizers. Additives for improving thermal conductivity and/or electrical conductivity, or antistatic agents may also be of interest for industrial applications.

It may also be possible to apply inorganic additives in order to reduce the flammability of the 3D object, or in order to improve thermal properties, surface conductivity and/or haptic properties, an example being silicon oxide, aluminum oxide or—in the case of dark-colored objects—carbon black as additive on the surface. The respective effect here is markedly more effective than when the corresponding additives have been added to the matrix of the material.

Graphene can be used as additive in particular in order to improve the thermal and electrical conductivity of the surface.

The additives may be provided from separate feed containers or in a mixture with one or more colorants. The method by which the respective build material and/or support material is coated with the additives may be such that even after melting in the nozzle they are preferably present at the surface of the extruded strands and at that location achieve their effect, an example being adhesion-improving properties of the strands with respect to one another, or surface conductivity.

In one particular embodiment, the device for producing three-dimensional structures may have a third printing head. The optional third printing head comprises a filament for a second build material, which may differ from the first build material. This build material is applied as print by the third printing head. The color compositions may optionally also comprise fillers which during the printing process give the transparent build material where necessary non-transparent optical properties.

It may be possible that the first printing head comprises a build material that upstream of the coloring process is not colored and is non-transparent, and the third printing head comprises a build material that upstream of the coloring process is not colored and is transparent. It is preferable that both printing heads respectively have dedicated mixing devices which are served by the same feed containers.

It may be preferable that the build materials respectively comprise thermoplastically processable material. The build material may comprise acrylonitrile-butadiene-styrene terpolymer (ABS), polycarbonate (PC), poly(meth)acrylate, polyphenylene sulfone (PPSU), HDPE, polyetherimide (PEI), polyether ether ketone (PEEK), polylactic acid (PLA) or a mixture of at least two of these polymers, or a mixture composed of at least 50% by weight of one of the polymers. The term (meth)acrylate here means either methacrylate, e.g. methyl methacrylate, ethyl methacrylate, etc. or acrylates, e.g. ethylhexyl acrylate, ethyl acrylate, etc., or else a mixture of the two.

In relation to the second, optional build material from the third nozzle, preference may be particularly given to polymethacrylate or polycarbonate.

In relation to the support material from the first printing head, this should preferably involve an acid-, base- or water-soluble polymer.

The device according to the invention for use in an extrusion-based 3D printing is designed such that the respective color shade is input into a CAD program, and that a file is provided which comprises, in addition to the coordinates, the color information for the manufacturing process and for regulation of the formulation of materials and of colorants. An example of a suitable file format is described in Additive Manufacturing File Format (ASTM F2915-12). The respective color shade may be established by regulating the metering devices and by controlled metering of the respective primary colors and, respectively, black from the feed containers into the system.

The coating units of the first and, respectively, the third printing head may optionally have further feed containers which comprise further pigments in addition to black and to the inks and/or primary colors or additives. The further pigments may comprise metallic pigments and/or fluorescent pigments.

The feed containers may also comprise additives, adhesion promoters or adhesives which can be activated and/or can be heated by microwaves or by magnetic or electric fields. These may have been added either to one composition or to all of the compositions, or may be added from separate feed containers. In the latter case, the said compositions are colorless. The person skilled in the art arrives at the specific selection of the appropriate additives by considering the composition and the build material used.

One or more feed containers may also comprise cross-linking agents, initiators or accelerators which through contact with the filament, through reaction with one another in the mixture, or through thermal or other activation of the reaction in the fixing unit and/or downstream of the extrusion process, lead to a reaction, for example addition reaction or crosslinking, thus giving a three-dimensional object which entirely or to some extent has the properties of an elastomer or of a thermoset.

A reaction of the surface coating may also take place subsequently, in that additives activatable by means of microwaves, heat, plasma, UV light or magnetic fields are first applied as coating, and these are appropriately activated in a following step. A particularly advantageous reaction occurs on the surface of the extruded strands, and in particular may also be utilized for the crosslinking of the strands to one another. However, this subsequent crosslinking may also be brought about within the former filaments by diffusion or by an additional dynamic or static mixer unit, already described above, in the region of the printing head in which the molten filament is present.

In an alternative embodiment, the additives from various feed containers may themselves react with one another after the mixing process and thus give chemical crosslinking at the filament surface and/or improve the adhesion that the filaments downstream of the printing process exhibit towards one another.

The feed containers may be the movable cartridges known for color printing such as for 2D color ink-jet printers, or involve feed vessels from which liquids are removed by pumping, or involve cartridges which can be clamped into a reciprocating pump. The design of these may be such that they can be replaced or renewed simply and individually.

The present invention also includes an extrusion-based 3D color printing process which comprises coating of a continuously transported filament with additive compositions and/or with dye compositions, fixing of the additive composition and/or dye composition on the surface of the filament, entry of the coated filament into a printing head, melting of the filament in the printing head and discharge of the melt by a nozzle for the purposes of three-dimensional printing. In particular, the process is carried out by using an extrusion 3D printer according to the invention as described above.

An element of the process according to the invention is preferably that downstream of the printing process the coating constituents have accumulated on the surface of the strand.

DRAWING

FIG. 1 shows an example of an embodiment in which only the essential constituents of the invention have been depicted: coating unit, fixing unit and the printing head that is essential for the extrusion-based 3D printer.

1: Mixer for the color composition with attached feed containers (in different shades of grey)
2: Coating unit
3: Fixing unit
4: Printing head Numerous modifications and variations on the present invention are possible in view of the above description. It is therefore to be understood that within the scope of the appended claims, the invention may be practiced otherwise than as specifically described herein.

The invention claimed is:

1. A 3D extrusion printer, comprising:
   a first printing head comprising a nozzle which receives a coated solid build material filament, melts the coated solid build material filament, thereafter applies the melted coated solid build material as print to a print bed;
   a filament supply stream in communication with the first printing head which supplies a fixed coated solid build material filament to the first printing head;
   a coating unit upstream to the first printing head on the filament supply stream which applies a coating to a solid build material filament;
   a coating fixing region located between the coating unit and the first printing head;
   a plurality of feed containers equipped with metering devices to supply a coating composition comprising at least one of an additive and an ink to the coating unit; and
   a mixing unit between and in communication with the plurality of feed containers wherein the coating composition is mixed prior to being supplied to the coating unit; and
   wherein the coating material applied to the filament in the coating unit is completely or incompletely fixed in the fixing region before entering the first printing head.

2. The 3D extrusion printer according to claim 1, wherein the first printing head further comprises a static mixer in a lower region of the nozzle.

3. The 3D extrusion printer according to claim 1, further comprising:
   a guide system or a brake upstream of the coating unit; and
   a conveying unit between the fixing region and the first printing head; such that the solid build material filament is tensioned in the coating unit by the guide system or brake and the conveying unit.

4. The 3D extrusion printer according to claim 1 further comprising:
   a second printing head configured for applying a support material as print; and
   optionally, a third printing head constructed equivalently to the second printing head which is configured for applying a filament stream for a second build material.

5. The 3D extrusion printer according to claim 4, comprising the third printing head, wherein
   the second printing head is configured for applying the support material that upstream of the coating process the filament is not colored and is non-transparent, and
   the third printing head is configured for applying a build material that upstream of the coating process is not colored and is transparent.

6. The 3D extrusion printer according to claim 4 wherein the second and third printing heads each respectively have dedicated mixing devices, which are in communication with common ink-feed containers of the plurality of feed containers.

7. The 3D extrusion printer according to claim 4, comprising the third printing head, wherein
   the first and third printing heads are each independently configured to apply materials comprising: a thermoplastically processable material, and
   the second printing head is configured to apply material comprising: a polymethacrylate or a polycarbonate.

8. The 3D extrusion printer according to claim 7, wherein the thermoplastically processable material of the first and third printing heads comprises a polymer selected from the group consisting of an acrylonitrile-butadiene-styrene terpolymer (ABS), a polycarbonate (PC), a poly(meth)acrylate, a polyphenylene sulfone (PPSU), a high density polyethylene (HDPE), a polyetherimide (PEI), a polyether ether ketone (PEEK) and a polylactic acid (PLA).

9. The 3D extrusion printer according to claim 4, wherein the support material of the second printing head comprises an acid-soluble, base-soluble or water-soluble polymer.

10. The 3D extrusion printer according to claim 1, further comprising a computer wherein a color shade of the print is input into a CAD program, and that a file is provided to the computer which comprises, in addition to coordinates, color information for the manufacturing process and for the regulation of the formulation of materials and of inks such that respective color shade is established through regulation of the metering devices and controlled metering of primary colors and black inks from the plurality of feed containers into the coating unit.

11. The 3D extrusion printer according to claim 1, wherein one of the plurality of feed containers is configured for applying materials comprising: a colorless coating composition which comprises one selected from the group consisting of an activatable additive, an adhesion promoter and an adhesive.

12. The 3D extrusion printer according to claim 1, wherein the fixing region comprises a fixing unit or is a length measuring at least 1 cm.

13. The 3D extrusion printer according to claim 1, further comprising sensors arranged upstream of the first printing head, wherein the sensors determine the diameter of the coated solid build filament and the flow of materials to the coating unit is optimized with information for color monitoring and print control.

* * * * *